Oct. 15, 1968   D. G. ANDERSON ET AL   3,405,976
PIPELINE TRANSPORTATION OF SOLIDS
Filed March 31, 1966   2 Sheets-Sheet 1
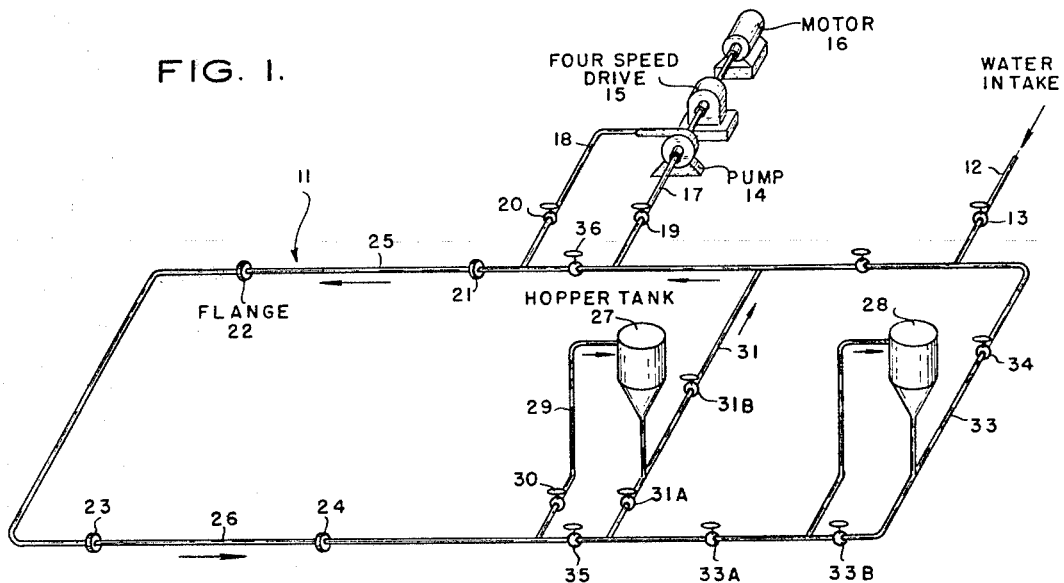
FIG. 1.
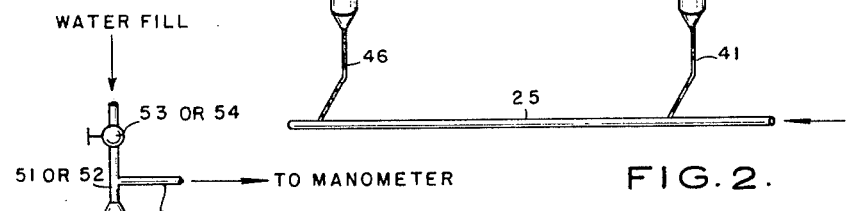
FIG. 3.
FIG. 2.
INVENTORS.
DONALD G. ANDERSON,
RAYMOND H. PFREHM,
BY
ATTORNEY.
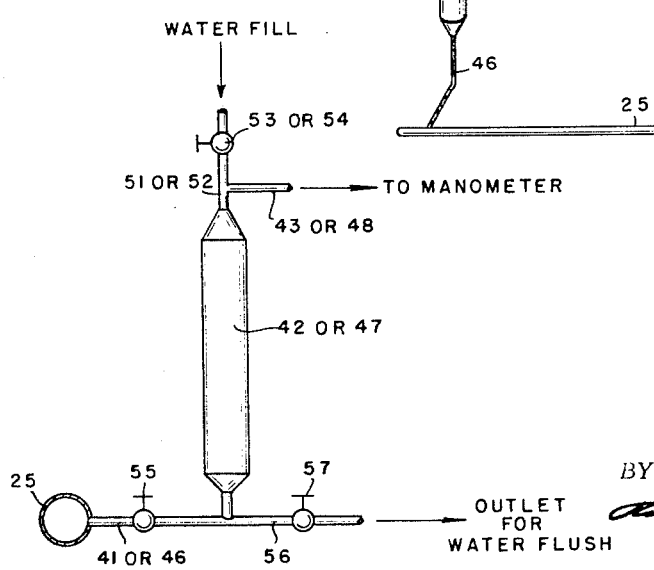

United States Patent Office 3,405,976
Patented Oct. 15, 1968

3,405,976
PIPELINE TRANSPORTATION OF SOLIDS
Donald G. Anderson, 5219 Trail Lake 77045, and Raymond H. Pfrehm, 3411 Mona Lee Lane 77055, both of Houston, Tex.
Filed Mar. 31, 1966, Ser. No. 539,023
5 Claims. (Cl. 302—14)

ABSTRACT OF THE DISCLOSURE

A stable suspension of granular iron ore in water is formed by providing a solids content of about 63%–68% by weight and about 32%–37% by weight of water in the suspension, the solids containing about 1.5% to about 2.5% of bentonite, the remainder being granular iron ore. This suspension may be pumped through a pipeline without settling and iron ore is then recovered from the suspension.

---

The present invention is concerned with the formation of stable suspensions of iron ore. More particularly, the invention is concerned with the formation and pumping of stable suspensions of iron ore. In its more specific aspects, the invention is concerned with a pumpable suspension of granular iron ore and water.

The present invention may be briefly described as a method of transporting granular iron ore in which a stable suspension of granular iron ore, bentonite, and water is formed. The suspension has a solids content within the range of about 63% to about 68% by weight and contains from about 32% to about 37% by weight of water. The solids of the stable suspension contain from about 1.5% to about 2.5% of bentonite and from about 98.5% to about 97.5% by weight of the granular iron ore. This stable suspension is then pumped through a pipeline, and at the terminus of the pipeline the solids are recovered from the suspension for use in making steel and the like.

The iron ores employed in the present invention may be any one of the many iron ores which are found throughout the world. In the following Table I are given typical iron ores and specific gravities of the iron ores.

TABLE I

| Iron ores: | Specific gravity |
|---|---|
| Hematite | 4.9–5.3 |
| Ilmentite | 4.44–4.90 |
| Lepidocrocite | 4.09 |
| Marcasite (FeS$_2$) | 4.61–4.90 |
| Taconite | 4.5 |
| Pyrite | 4.95–5.17 |
| Magnetite | 4.967–5.180 |
| Chromite | 4.32–4.57 |
| Siderite | 3.00–3.88 |

These iron ores may be used in the practice of the present invention.

It is to be preferred to use an iron ore such as magnetite in the form of taconite, which is a magnetite-type concentrate. A typical analysis of taconite concentrate suitable in the practice of the present invention will be found in Table II.

TABLE II

| | |
|---|---|
| Fe$_3$O$_4$ (magnetite) | percent_ 90 |
| Impurities | do____ 10 |
| Available iron | do____ 63 |
| Specific gravity | 4.5 |

The iron ore shown in Table II contained approximately 3% by weight of water. In the examples, which will be described further herein, the water was removed by baking the iron ore to provide dry solid for an accurate slurry preparation.

The iron ore shown in Table II had the particular size analysis as shown in Table III.

TABLE III

| | Percent |
|---|---|
| Through 20 mesh on 40 mesh | Trace |
| Through 40 mesh on 100 mesh | 1.0 |
| Through 100 mesh on 200 mesh | 32.3 |
| Through 200 mesh on 325 mesh | 39.6 |
| Through 325 mesh on pan mesh | 27.1 |

The present invention also involves a stable, pumpable suspension which comprises granular iron ore, bentonite, and water having a solids content within the range of about 63% to about 68% by weight and contains from about 32% to about 37% by weight of water. The solids contain from about 1.5% to about 2.5% by weight of bentonite and from about 98.5% to about 97.5% by weight of the granular iron ore.

The bentonite employed in the present invention may be any one of the several bentonites which are available on the market. Examples of such bentonites include Wyoming and Texas bentonite, or other high yield montmorillionite clay, and the like.

The amount of bentonite employed in the present invention is critical and is in the range of about 1.5% to about 2.5% by weight in admixture with about 98.5% to about 97.5% by weight of granular iron ore. A suspension containing 65% by weight of solids, of which 98.0% by weight is granular iron ore and 2% by weight is bentonite, in admixture with 35% by weight of water is preferred.

The present invention will be further illustrated by reference to the drawing in which FIG. 1 illustrates a test pipeline loop;

FIG. 2 shows the manometer arrangement of FIG. 1;

FIG. 3 is a detailed partial cross-sectional view of the manometer connection of FIG. 2.

Figure 4:
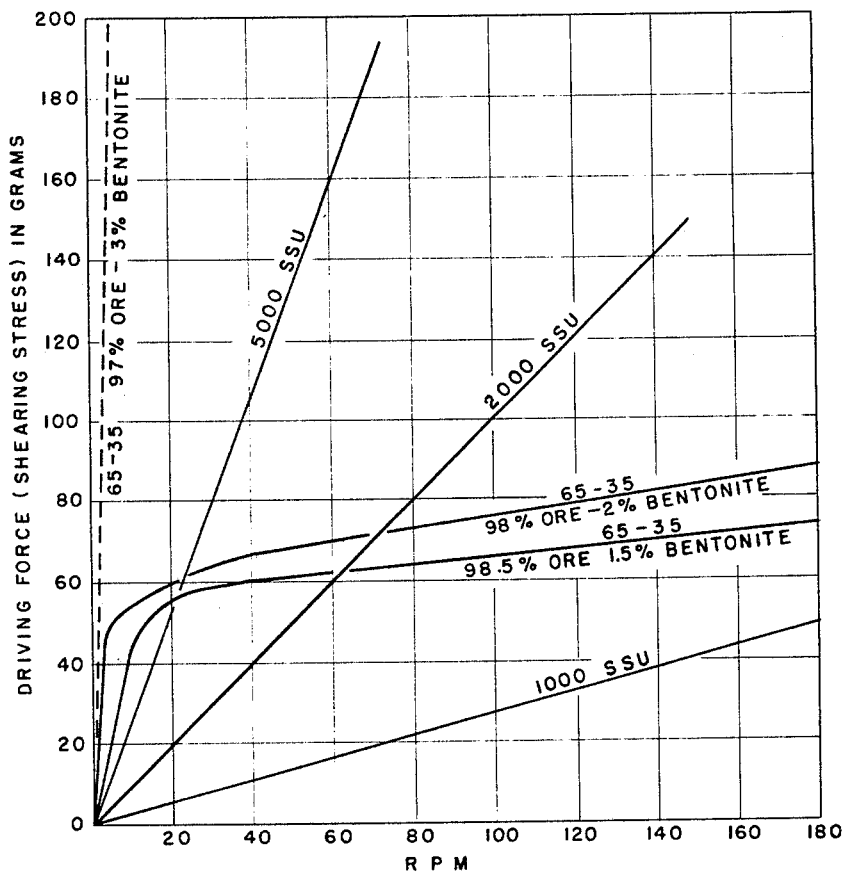
FIG. 4 is a plot of data showing viscosity relationships for various iron ore suspensions.

Referring now to the drawing and particularly to FIGS. 1 to 3, numeral 11 designates generally a pipeline loop arrangement into which water may be introduced by way of line 12, controlled by valve 13, from a source not shown. Connected into the pipeline loop 11 is a centrifugal pump 14 provided with a four-speed drive 15 and driven by a motor 16. The pump 14 connects to the loop 11 by lines 17 and 18, controlled, respectively, by throttling valves 19 and 20. Line 17 is the intake of the pump 14, and line 18 is the discharge. The pipeline loop 11 may be provided with flanges 21, 22, 23, and 24 in order to provide replaceable sections 25 and 26 in the pipeline loop 11. Of course, other replaceable sections besides 25 and 26 may be provided. Connected in the pipeline loop 11 is a first hopper tank 27 and a second hopper tank 28. Hopper tank 27 connects into the loop by branch line 29, controlled by valve 30, and discharges into the pipeline 11 by way of line 31. Hopper tank 28 connects into pipeline loop 11 by way of line 32 and discharges into the pipeline loop 11 by line 33, controlled by valve 34. Valve 35 serves to close off hopper tank 28 from the system, as may be desired. Valve 36 is arranged between the intake line 17 and the discharge line 18 for control purposes, as may be desired.

As shown in FIG. 2, the pipe sections, such as 25 and 26, may be provided with one or more manometers, such as manometer 40, which may be connected into the pipe section 25 by line 41 containing a manometer bottle 42 and connecting to the manometer 40 by line 43 and branch line 44, controlled by valve 45. The downstream leg of the manometer 40 is connected to the pipe section 25 by pipe 46 containing manometer bottle 47, which connects to the manometer 40 by pipe 48 and branch line 49, controlled by valve 50. The pipes 43 and 48 are provided with branch lines 51 and 52 containing valves 53 and 54, respectively, for introduction of water into the manometer bottles 42 and 47.

FIG. 3 shows a detailed view of manometer bottle 42 of 47 connected to the pipe section 25 by conduits such as 41 or 46. In this particular instance, the conduit 41 or 46 is shown with a valve 55, and the pipe 41 or 46 is shown with an outlet such as 56, controlled by valve 57, for flushing water from the line 41 or 46 as desired.

The pipe loop illustrated in FIGS. 1 to 3 may be employed as follows when pumping studies are made. Water is first added to the pipe loop, such as 11, and circulated by a pump, such as 14. Thereafter, bentonite may be added from a hopper tank, such as 27, and the bentonite-water mixture circulated for a sufficient length of time to cause hydration. While complete hydration, as measured by the API standard, requires 16 to 24 hours or overnight, it has been found that approximately 90-95% hydration of bentonite occurs, when fresh water is used, in the first 15 minutes. Thus, after circulation of the bentonite-water mixture for about one-half hour, the iron ore is added from a hopper tank, such as 27 or 28, and pumped through the pipeline loop, such as 11, with suitable pressure determination being made with the manometer, such as 40. In the particular figure, the pipeline loop is made up of 4-inch pipe, but the pipe sections, such as 25 and 26, may be 2-inch, 4-inch, 6-inch or 8-inch sections. Likewise, the pipe loop may include a turbine meter such as a Halliburton meter, which suitably may be located between the flanges 22 and 23. As an example only, the short length of the rectangle of the loop may be about 9 feet in length, with the turbine meter being located equidistance along the short length of the rectangle.

The pipe loop 11 may be employed for circulation of the slurries therein through branch line 31 by manipulation of valves 31A and 31B or circulation may be through line 33 with valves 31A and 31B in the closed position. In the latter case, valves 33A and 33B would be open. Of course, where one material is added through tank 27 and the other from tank 28, circulation through both lines 31 and 33 may be obtained. Thus, bentonite may be added from tank 27 and iron ore from tank 28, and the like.

In order to illustrate the invention further, the preparation of slurries or suspensions of iron ore having the properties shown in Tables II and III will be described. These slurries or suspensions were mixed in a loop such as pipeline loop 11. Water was first added to the loop and the bentonite was added to the water by centrifugal pump circulation; and, finally, the iron ore was added to the circulating bentonite-water mixture. These hydraulic pumping tests were conducted after the iron ore bentonite-water slurry had been hydrated overnight.

The initial slurry mixed in the pipe loop contained 73% by weight solids, of which 1.5% by weight was bentonite. Hydraulic tests were made in 4-inch and 6-inch test pipe sections. The 1.5% by weight bentonite content iron ore slurries had a solids concentration in the range of 65-73% by weight. Hydraulic tests were also conducted with 2% bentonite-containing iron ore slurries in the 63-70% solids range. These hydraulic tests showed that the iron ore slurries containing 2% bentonite and containing less than 63% solids were on the verge of instability and were not useful in the practice of the present invention.

Moreover, pressure drop versus flow rate studies covering the practical range of iron ore slurries that are pumpable in a pipeline show that solids concentrations of iron ore slurries containing bentonite above about 68% by weight are impracticable. These data are shown in Table IV.

TABLE IV

| Percent solids: | P.s.i./mile |
|---|---|
| 65 | 23.5 |
| 67.5 | 30.8 |
| 70 | 55.8 |
| 73 | 98.0 |

Thus, above about 68% by weight solids, the pressure drop in pounds per square inch per mile is so large that such slurries or suspensions are not pratically pumpable.

Likewise, data obtained in the pipeline loop 11 show that less than 1.5% bentonite solids results in slurries which are unstable. Furthermore, the results showed that the iron ore-bentonite slurry is sufficiently stable that no blocking problems are encountered in a pipeline when pumping ceases and that pumping may be resumed in the pipeline after shutdown.

In order to illustrate the preferred suspension, reference is had to FIGURE 4, which is a plot of data of driving force in grams against revolutions per minute in the modified Stormer test. The Stormer test is well known, and the modified test involves only a modification of the standard cups. Thus, the standard cup has two partitions which extend from the cup wall to a point in close proximity to the spindle, while the modified cup has no partitions, but has a pedestal in the center to retard rotation of the iron ore slurry being tested. The modified cup was used for all measurements shown in FIG. 4. In FIG. 4, tests of three iron ore-bentonite-water slurries which were made by admixing are shown. It is to be noted that the amount of bentonite is quite critical. Thus, 3% of bentonite produced a stable slurry, but the viscosity was so high that it was unpumpable. The 1.5% bentonite slurry had slight instability, but there was only a small reduction in viscosity from the 2% bentonite slurry. Thus, in a suspension containing 65% by weight solids and 35% by weight of water, best results are obtained in a mixture of 98% iron ore containing 2% bentonite. For comparison purposes, in FIG. 4 there are shown viscosity curves at 5000, 2000 and 1000 Saybolt Universal seconds.

At the terminus of the pipeline, the iron ore is separated from the suspension such as by settling, centrifugation, and the like. Separation and recovery may be obtained simply by adding additional water to the suspension.

As described, the suspension or slurry of iron ore may be formed in the pipeline by introducing water, then bentonite, and finally the iron ore. Or, the slurry or suspension may be made separately in mixing devices and then introduced into the pipeline.

It is to be understood that the pipe loop 11 may form part of the pipeline through which the slurry is pumped and a connection to the loop 11 may be made with the pipeline anywhere downstream from pump 14. Thus, pipe loop 11 may suitably be the originating point in the pipeline by means of which the slurry is formed and introduced thereinto.

The present invention is quite important and useful in that a method is provided for transporting iron ores through a pipeline which are in the form of stable suspensions, which will pump, and which do not separate even when the suspensions are allowed to stand for a length of time. Thus, in settling tests taking 100 ml. of four slurries containing various amounts of solids and bentonite, it was found that the suspensions in accordance with the present invention containing the critical amounts of bentonite were substantially stable over a period of 120 hours.

Thus, the present invention allows the pumping of iron ore over long distances, such as between the mine and iron smelter, by employing critical amounts of bentonite in a stable suspension of iron ore and water.

The nature and objects of the present invention having been completely described and illustrated and the best mode and embodiment contemplated set forth, what we wish to claim as new and useful and secure by Letters Patent is:

1. A method of transporting granular iron ore which comprises:
forming a stable suspension of granular iron ore, bentonite, and water having a solids content within the range from about 63% to about 68% by weight and containing from about 32% to about 37% by weight of water;
said solids containing from about 1.5% to about 2.5% by weight of bentonite and from about 98.5% to about 97.5% by weight of said granular iron ore;
pumping said suspension through a pipeline; and recovering said solids from said suspension pumped through said pipeline.

2. A method in accordance with claim 1 in which the suspension has a solids content of about 65% by weight and said solids contain about 2% by weight bentonite and about 98% by weight of granular iron ore.

3. A method in accordance with claim 1 in which the iron ore is a taconite concentrate having a specific gravity of about 4.5.

4. A method in accordance with claim 1 in which the iron ore has a particle size distribution such that over 90% by weight passes through 100 mesh screen.

5. A method in accordance with claim 1 in which the iron ore has a particle size distribution of:

| | Percent |
|---|---|
| Through 20 mesh on 40 mesh | Trace |
| Through 40 mesh on 100 mesh | 1.0 |
| Through 100 mesh on 200 mesh | 32.3 |
| Through 200 mesh on 325 mesh | 39.6 |
| Through 325 mesh on pan | 27.1 |

References Cited
UNITED STATES PATENTS

| | | | |
|---|---|---|---|
| 1,876,629 | 9/1932 | Denning | 106—308 |
| 2,085,517 | 6/1937 | Campen | 252—313 |
| 2,610,901 | 9/1952 | Cross | 302—66 |
| 3,206,256 | 9/1965 | Scott | 302—66 |

ANDRES H. NIELSEN, *Primary Examiner.*